United States Patent
Okamoto

(10) Patent No.: US 10,859,528 B2
(45) Date of Patent: Dec. 8, 2020

(54) GAS SENSOR

(71) Applicant: NGK INSULATORS, LTD., Nagoya (JP)

(72) Inventor: Taku Okamoto, Nagoya (JP)

(73) Assignee: NGK INSULATORS, LTD., Nagoya (JP)

(*) Notice: Subject to any disclaimer, the term of this patent is extended or adjusted under 35 U.S.C. 154(b) by 16 days.

(21) Appl. No.: 16/297,943

(22) Filed: Mar. 11, 2019

(65) Prior Publication Data

US 2019/0277797 A1    Sep. 12, 2019

(30) Foreign Application Priority Data

Mar. 12, 2018  (JP) .................... 2018-043914

(51) Int. Cl.
| | |
|---|---|
| *G01N 27/407* | (2006.01) |
| *G01N 27/30* | (2006.01) |
| *G01N 27/409* | (2006.01) |

(52) U.S. Cl.
CPC ....... *G01N 27/4076* (2013.01); *G01N 27/301* (2013.01); *G01N 27/307* (2013.01); *G01N 27/409* (2013.01); *G01N 27/4071* (2013.01); *G01N 27/4075* (2013.01); *G01N 27/4077* (2013.01)

(58) Field of Classification Search
CPC ................................................ G01N 27/4075
See application file for complete search history.

(56) References Cited

U.S. PATENT DOCUMENTS

| | | | |
|---|---|---|---|
| 2016/0033447 A1 | 2/2016 | Nakasone et al. | |
| 2016/0209358 A1* | 7/2016 | Toudou | ................ G01N 27/407 |
| 2017/0370874 A1* | 12/2017 | Nakatou | ................ G01N 27/41 |

FOREIGN PATENT DOCUMENTS

| | | | | |
|---|---|---|---|---|
| DE | 4408504 | * | 3/1994 | ........... G01N 27/407 |
| JP | 2016-033510 A | | 3/2016 | |
| JP | 2017-116371 A | | 6/2017 | |

OTHER PUBLICATIONS

EPO machine-generated English language translation of Hoetzel et al. DE 4408504 A1 (Year: 1994).*

* cited by examiner

*Primary Examiner* — Alexander S Noguerola
(74) *Attorney, Agent, or Firm* — Mattingly & Malur, PC

(57) ABSTRACT

A mixed-potential type gas sensor includes: a first sensing electrode containing a Pt—Au alloy and a second sensing electrode containing Pt, both sensing electrodes being provided on the surface of a sensor element made of an oxygen-ion conductive solid electrolyte; a reference electrode provided inside the sensor element to be made contact with air; a first protective layer group covering the first sensing electrode; a second protective layer group covering the second sensing electrode; and concentration identification element configured to identify the concentration of a sensing target gas component based on potential differences between both of the first sensing electrode and the second sensing electrode and the reference electrode. The response times of the first and second sensing electrodes are both equal to or shorter than 10 seconds, and the response time difference therebetween is 2 seconds or shorter.

10 Claims, 8 Drawing Sheets

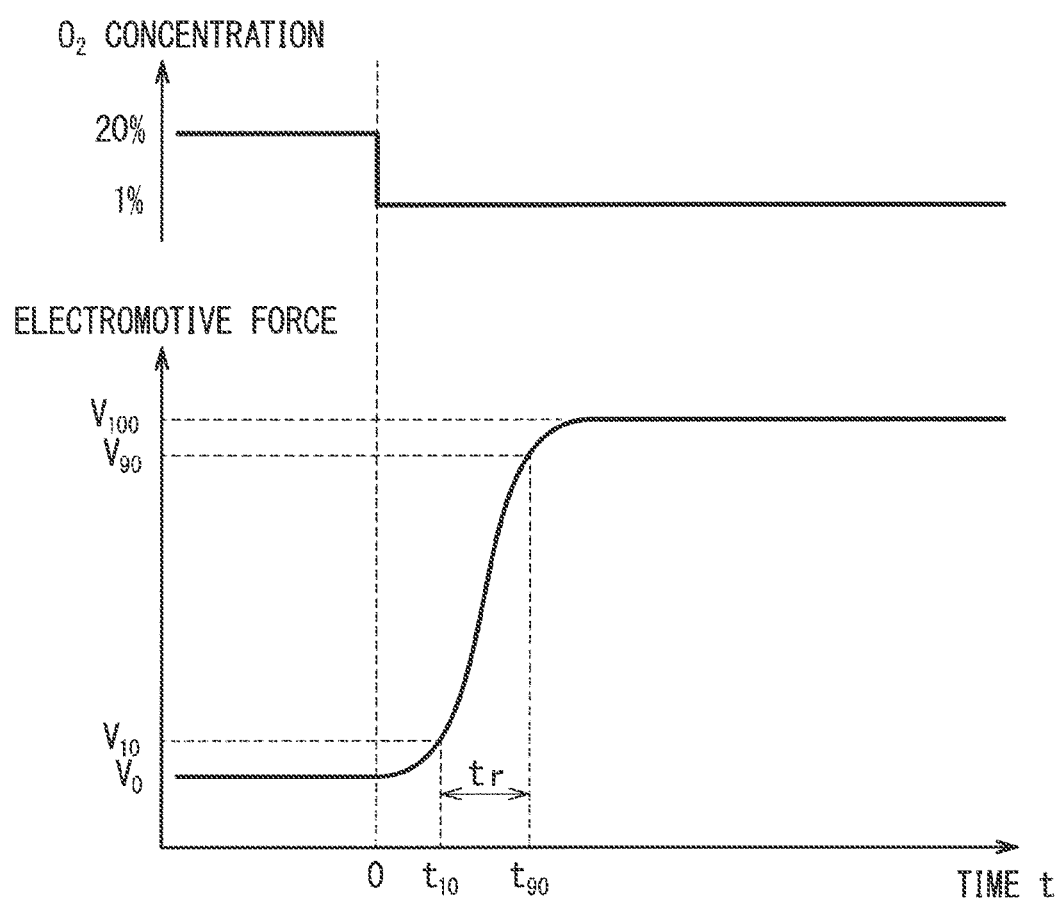

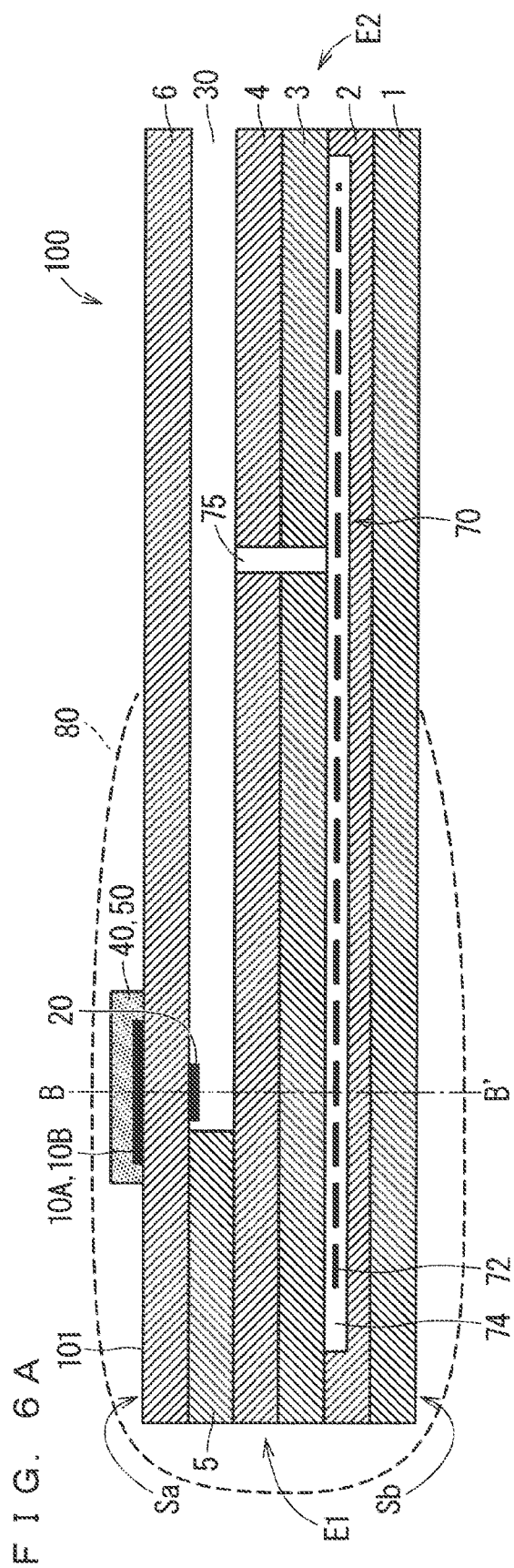
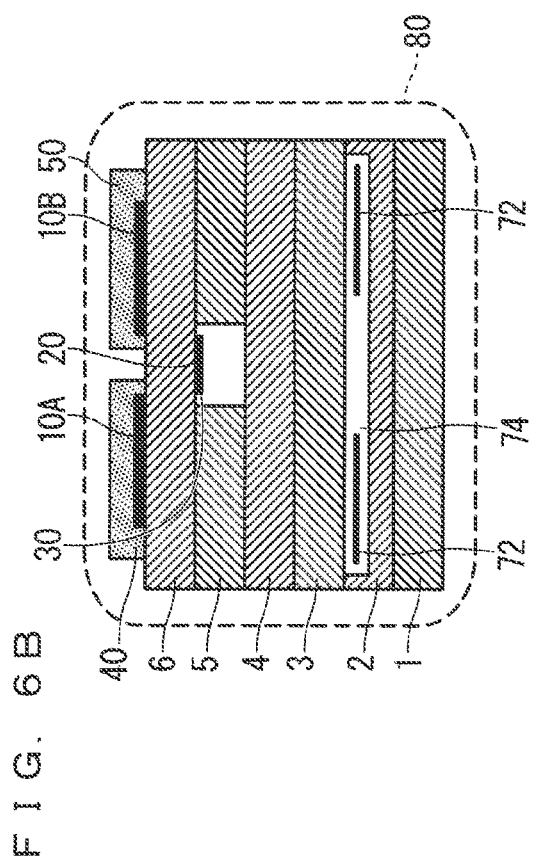
FIG. 6A
FIG. 6B

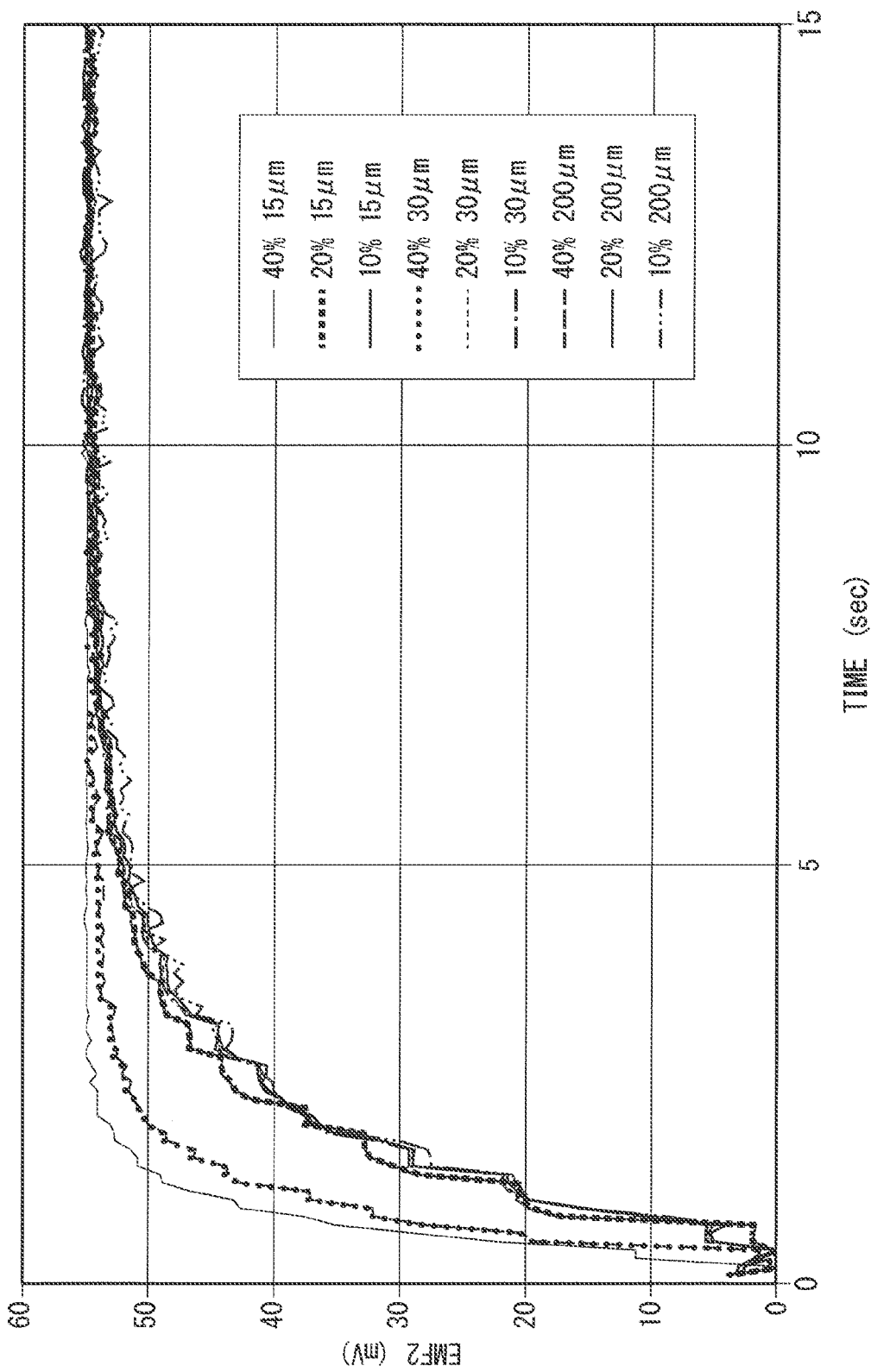

GAS SENSOR

CROSS-REFERENCE TO RELATED APPLICATION

The present application claims priority from Japanese application JP2018-043914, filed on Mar. 12, 2018, the contents of which is hereby incorporated by reference into this application.

BACKGROUND OF THE INVENTION

Field of the Invention

The present invention relates to a mixed-potential gas sensor, and particularly relates to a responsivity thereof.

Description of the Background Art

A mixed-potential gas sensor configured to sense hydrocarbon, carbon monoxide, ammonia, or the like is already known (refer to Japanese Patent Application Laid-Open No. 2016-033510 and Japanese Patent Application Laid-Open No. 2017-116371, for example).

The mixed-potential gas sensor determines the concentration of a sensing target gas component by exploiting the fact that a potential difference (sensor output) generated between a sensing electrode provided to be in contact with measurement gas and variable in potential in accordance with the concentration of a sensing target gas present in the measurement gas and a reference electrode provided to have a substantially constant potential has a correlation with the concentration of the sensing target gas in the measurement gas.

In a case in which the above-described hydrocarbon, carbon monoxide, ammonia, or the like is to be sensed, when oxygen is present in addition to the sensing target gas in measurement gas, the sensor output interferes with oxygen. In other words, since the sensor output value fluctuates with the concentration of oxygen existing in the measurement gas, it is necessary to correct the sensor output or the concentration of the sensing target gas based on the concentration of oxygen to accurately determine the concentration of the sensing target gas.

For example, when hydrocarbon, carbon monoxide, or ammonia is to be sensed with a mixed-potential gas sensor in an exhaust path from an internal combustion of an automobile engine or the like, the concentration of oxygen can be identifies based on an output value from an oxygen sensor, an A/F sensor, an NOx sensor, or the like provided separately from the mixed-potential gas sensor.

However, since these sensors are not necessarily provided in the vicinity of the mixed-potential gas sensor, it is necessary to consider gas time lag to improve the accuracy of measurement of the sensing target gas. In addition, the flow speed of the exhaust gas from the internal combustion engine is not constant but changes every moment, and thus it is not necessarily easy to excellently perform the correction based on the oxygen concentration.

SUMMARY

The present invention relates to a mixed-potential gas sensor, and particularly relates to a responsivity thereof.

According to the present invention, a mixed-potential gas sensor configured to sense a sensing target gas component contained in measurement gas and identify a concentration of the sensing target gas component includes: a sensor element made of an oxygen-ion conductive solid electrolyte; a first sensing electrode as a cermet electrode provided on a surface of the sensor element and containing a Pt—Au alloy; a second sensing electrode as a cermet electrode provided on the surface of the sensor element and containing Pt; a reference electrode provided inside the sensor element to be made contact with air; a first protective layer group including one or a plurality of porous protective layers each covering the first sensing electrode; a second protective layer group including one or a plurality of porous protective layers each covering the second sensing electrode; and a concentration identification element configured to identify the concentration of the sensing target gas component in the measurement gas, the concentration identification element being configured to acquire, while the gas sensor is disposed in the measurement gas, a first sensor output as a potential difference occurring between the first sensing electrode and the reference electrode in accordance with the concentration of the sensing target gas component and a concentration of oxygen, and a second sensor output as a potential difference occurring between the second sensing electrode and the reference electrode in accordance with the concentration of oxygen, and identify the concentration of the sensing target gas component in the measurement gas based on the first and second sensor outputs. The response times of the first and second sensing electrodes are both 10 seconds or shorter, and the difference between the response time of the first sensing electrode and the response time of the second sensing electrode is 2 seconds or shorter. According to the present invention, the concentration of a sensing target gas component can be identified without oxygen interference at preferable accuracy while a responsivity is achieved.

The present invention is intended to provide a gas sensor capable of accurately measuring sensing target gas even under oxygen interference.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram illustrating a response measurement profile;

FIGS. 6A and 6B are diagrams illustrating a configuration in which a leading end protective layer 80 is provided on a predetermined range of the sensor element 101 on a leading end part E1 side;

FIG. 8 is a diagram exemplarily illustrating the response measurement profile for nine kinds of the gas sensors 100 among which the porosity and thickness of a second protective layer 50 are different.

DESCRIPTION OF THE PREFERRED EMBODIMENTS

<Overview of Gas Sensor>

Figure 1:
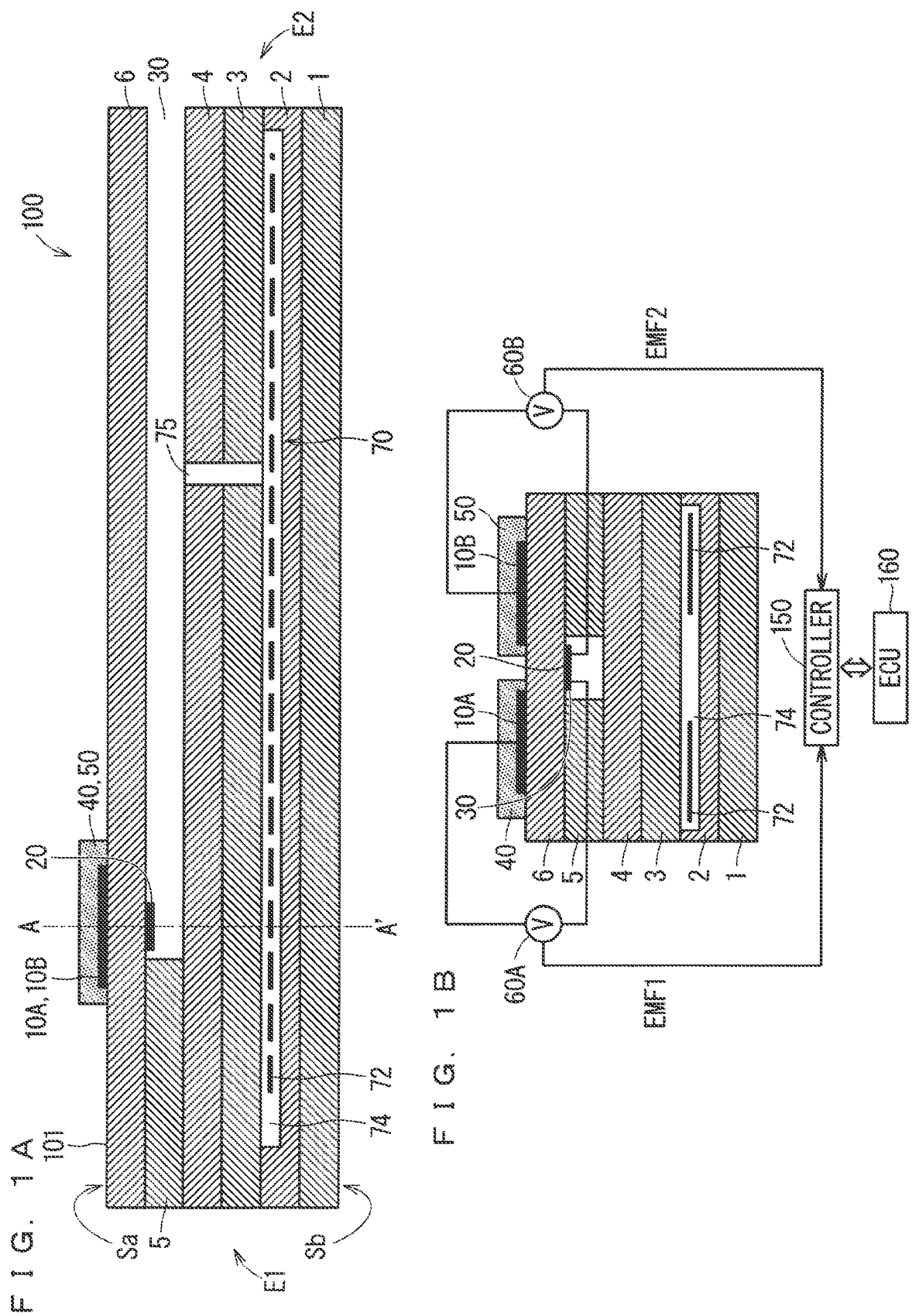
FIGS. 1A and 1B are sectional pattern diagrams schematically illustrating an exemplary configuration of a gas sensor 100.

FIGS. 1A and 1B are schematic cross-sectional views schematically illustrating an exemplary configuration of a gas sensor 100 according to the present preferred embodiment. FIG. 1A is a vertical cross-sectional view taken along the longitudinal direction (hereinafter, referred to as element longitudinal direction) of a sensor element 101 as a main constituent element of the gas sensor 100. FIG. 1B is a diagram including a section orthogonal to the element longitudinal direction at A-A' in FIG. 1A.

The gas sensor 100 is what is called mixed-potential gas sensor. Generally, the gas sensor 100 determines the concentration of a gas component to be sensed (sensing target gas component) by exploiting the fact that potential difference (electromotive force) occurs between a first sensing electrode 10A provided on the surface of the sensor element 101 mainly made of ceramic as oxygen-ion conductive solid electrolyte such as zirconia ($ZrO_2$) and a reference electrode 20 provided inside the sensor element 101, due to difference in the concentration of the sensing target gas component in the vicinities of the electrodes based on the principle of mixed potential. Hereinafter, the first sensing electrode 10A, the reference electrode 20, and the solid electrolyte between both electrodes are referred to as a first mixed potential cell.

More specifically, the gas sensor 100 is used to excellently determine the concentration of a predetermined gas component (sensing target gas component) in measurement gas that is exhaust gas in an exhaust pipe of an internal combustion such as a diesel engine or a gasoline engine. Examples of the sensing target gas component include hydrocarbon gas such as $C_2H_4$, $C_3H_6$, or n-C8, carbon monoxide (CO), and ammonia ($NH_3$).

When a plurality of kinds of gasses that can be sensed by the gas sensor 100 exist in the measurement gas, the potential difference generated between the first sensing electrode 10A and the reference electrode 20 is a value attributable to all the plurality of kinds of gasses, and thus the determined concentration value is the sum of the concentrations of the plurality of kinds of gasses. In particular, in a large number of situations in which the gas sensor 100 is used, exhaust gas as measurement gas contains oxygen, which can be sensed by the gas sensor 100, similarly to the above-described sensing target component. Thus, even when gas of a kind other than oxygen is assumed as the sensing target component, under the existence of oxygen, the potential difference generated between the first sensing electrode 10A and the reference electrode 20 in the first mixed potential cell also depends on the oxygen concentration of the measurement gas. This characteristic that the potential difference generated between the electrodes in the first mixed potential cell, and a concentration of a sensing target gas component identified based on the potential difference are affected by the existence of oxygen in the measurement gas is referred to as, for example, an $O_2$ interference. The $O_2$ interference needs to be removed to achieve the accuracy of measurement of the sensing target gas component.

In the sensor element 101, similarly to the first sensing electrode 10A, a second sensing electrode 10B is provided on the surface of the sensor element 101 to accomplish that purpose. When the concentration of the sensing target gas component is identified, correction is performed by using the potential difference generated between the second sensing electrode 10B and the reference electrode 20 in accordance with the oxygen concentration of the measurement gas. Hereinafter, the second sensing electrode 10B, the reference electrode 20, and the solid electrolyte between both electrodes are referred to as a second mixed potential cell.

In addition, the sensor element 101 mainly includes a reference gas introduction space 30 in which the reference electrode 20 is disposed, a first protective layer 40 covering the first sensing electrode 10A, and a second protective layer 50 covering the second sensing electrode 10B, in addition to the first sensing electrode 10A, the second sensing electrode 10B, and the reference electrode 20 described above.

<Details of Components>

The sensor element 101 has a structure in which six layers of a first solid electrolyte layer 1, a second solid electrolyte layer 2, a third solid electrolyte layer 3, a fourth solid electrolyte layer 4, a fifth solid electrolyte layer 5, and a sixth solid electrolyte layer 6, which are made of an oxygen-ion conductive solid electrolyte, are stacked in the stated order from the bottom side in the drawings, and additionally includes electrodes and other components mainly between the layers or on an outer peripheral surface of the element. The solid electrolyte forming the six layers is fully dense and airtight. Such a sensor element 101 is manufactured by, for example, laminating ceramic green sheets corresponding to the individual layers, which have been subjected to a predetermined process and printing of a circuit pattern, and further, by integrating the laminated layers through firing.

However, it is not essential that the gas sensor 100 includes the sensor element 101A as such a six-layer laminated body. The sensor element 101 may be formed as a laminated body having a larger or smaller number of layers or may not have a laminated structure.

In the following description, for sake of convenience, a surface located above the sixth solid electrolyte layer 6 in the drawings is referred to as a front surface Sa of the sensor element 101, and a surface located below the first solid electrolyte layer 1 is referred to as a rear surface Sb of the sensor element 101. When the gas sensor 100 is used to determine the concentration of the sensing target gas component in the measurement gas, a predetermined range extending from a leading end part E1 as one end part of the sensor element 101 and including at least the first sensing electrode 10A and the second sensing electrode 10B is disposed in a measurement gas atmosphere, and the remaining part including a base end part E2 as the other end part is disposed not in contact with the measurement gas atmosphere.

The first sensing electrode 10A senses the sensing target gas component. The first sensing electrode 10A is formed as a porous cermet electrode including an alloy containing Au of a predetermined ratio and Pt, in other words, a Pt—Au alloy, and zirconia. The catalytic activity of the first sensing electrode 10A for the sensing target gas component is disabled in a predetermined concentration range by excellently determining the composition of the Pt—Au alloy as the material of the sensing electrode 10. In other words, decomposition reaction of the sensing target gas component at the first sensing electrode 10A is suppressed. Accordingly, in the gas sensor 100, the potential of the first sensing electrode 10A varies selectively for the sensing target gas component in accordance with (in correlation with) the concentration of the sensing target gas component. In other words, the first sensing electrode 10A has such a characteristic that the potential thereof has high concentration dependency on the sensing target gas component in a predetermined concentration range but has small concentration dependency on any other component of the measurement gas.

More specifically, the first sensing electrode 10A is provided so as to excellently have an Au abundance ratio on the surface of the Pt—Au alloy particles constituting the electrode, thereby exhibiting remarkable dependency of potential on the concentrations of the sensing target gas component and oxygen.

The Au abundance ratio is preferably set to be, for example, 0.4 or higher when the sensing target gas component is ammonia gas, or 0.3 or higher when the sensing target gas component is hydrocarbon gas.

In the specification, the Au abundance ratio is the area ratio of a part covered by Au relative to a part at which Pt is exposed on the surface of a noble metal particle (Pt—Au alloy particle) included in the first sensing electrode 10A. For example, the Au abundance ratio can be calculated through the following equation by using detected values of Au and Pt in an Auger spectrum obtained by performing Auger electron spectroscopy (AES) analysis on the surface of the noble metal particle:

$$\text{Au abundance ratio} = \text{Au detected value}/\text{Pt detected value} \ldots \quad (1)$$

Alternatively, the Au abundance ratio may be calculated by a relative sensitivity coefficient method based on the peak intensities of Au and Pt at detection peaks, which can be obtained by X-ray photoelectron spectroscopy (XPS). The Au abundance ratio is 1 when the area of the part at which Pt is exposed is equal to the area of the part covered by Au.

The first sensing electrode 10A may be formed to have a porosity equal or more than 10% and equal or less than 40%, and a thickness equal or more than 5 μm and equal or less than 35 μm. In the present preferred embodiment, the porosity of each of various kinds of electrodes and layers can be identified from a binary image of a cross-sectional SEM image (secondary electron image) of the target electrode or layer by a well-known method.

The second sensing electrode 10B senses oxygen. The second sensing electrode 10B is formed as a porous cermet electrode of Pt and zirconia. Since the second sensing electrode 10B contains no Au, the second sensing electrode 10B has catalytic activity for the sensing target gas component. Thus, the second sensing electrode 10B is provided to exhibit remarkable dependency of potential on the concentration of oxygen.

The second sensing electrode 10B may be formed to have a porosity equal or more than 10% and equal or less than 40%, and a thickness equal or more than 5 μm and equal or less than 35 μm.

Figure 2:
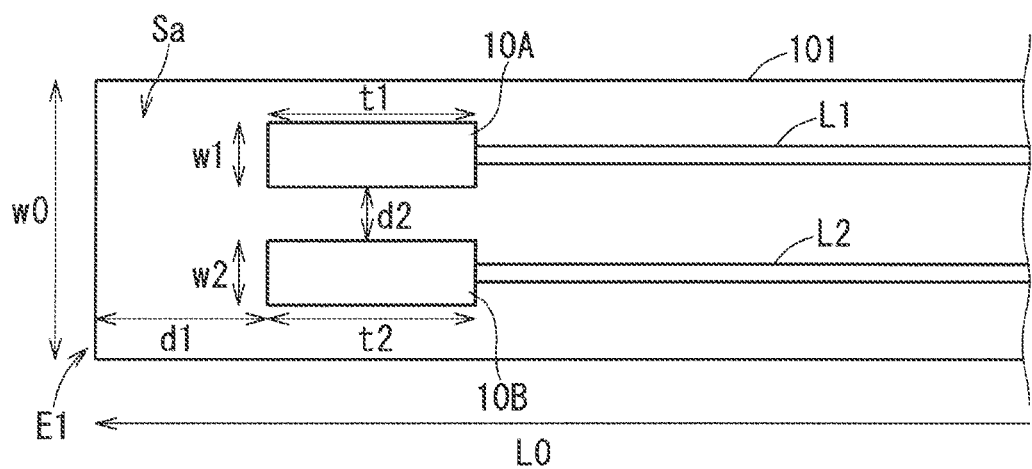
FIG. 2 is a plan view for description of the arrangement positions of a first sensing electrode 10A and a second sensing electrode 10B on a surface Sa of a sensor element 101 and the sizes of both electrodes.

FIG. 2 is a plan view for description of the arrangement positions of a first sensing electrode 10A and a second sensing electrode 10B on a surface Sa of a sensor element 101 and the sizes of both electrodes. However, in FIG. 2, illustrations of the first protective layer 40 and the second protective layer 50 are omitted. The sensor element 101 has a size L0 in the element longitudinal direction and a size w0 in an element width direction orthogonal to the element longitudinal direction.

The first sensing electrode 10A and the second sensing electrode 10B have rectangular shapes in plan view, and are separated by a predetermined distance d1 from the leading end part E1 as the one end part in the element longitudinal direction on the front surface Sa of the sensor element 101, and provided adjacent to each other at a predetermined interval d2 in the element width direction. It is preferable that a size t1 of the first sensing electrode 10A and a size t2 of the second sensing electrode 10B in the element longitudinal direction are equal to each other, and a size w1 of the first sensing electrode 10A and a size w2 of the second sensing electrode 10B in the element width direction are equal to each other. It is preferable to have t1=t2=1.5 mm to 2.5 mm, w1=w2=1 mm, d1=3 mm to 5 mm, and d2=0.3 mm to 0.5 mm for L0=45 mm to 70 mm and w0=4 mm to 6 mm. When the values of w1, t1, w2, and t2 are excessively large, detection sensitivity is achieved but variance in the responsivity potentially occurs in each sensing electrode, and thus the values are not preferable. When d2 is excessively large, both sensing electrodes are separated too much, and thus spatial variance in the concentration of the measurement gas is highly likely to cause large influence. As a result, the correction based on the potential difference in the second mixed potential cell potentially cannot be excellently performed, and thus the value is not preferable.

When the gas sensor 100 is used, part of the sensor element 101, which extends from the leading end part E1 to at least a part in which the first protective layer 40 covering the first sensing electrode 10A and the second protective layer 50 covering the second sensing electrode 10B are provided, is exposed to (directly in contact with) the measurement gas.

The reference electrode 20 has a substantially rectangular shape in plan view, and is provided inside the sensor element 101 and used as a reference for calculating the concentration of the measurement gas. The reference electrode 20 is formed as a porous cermet electrode of Pt and zirconia.

The reference electrode 20 may be formed to have a porosity equal or more than 10% and equal or less than 30% and a thickness equal or more than 5 μm and equal or less than 15 μm. As exemplarily illustrated in FIGS. 1A and 1B, the plane size of the reference electrode 20 may be smaller than or substantially equal to those of the first sensing electrode 10A and the second sensing electrode 10B.

The reference electrode 20 is exposed in the reference gas introduction space 30 provided inside the sensor element 101.

The reference gas introduction space 30 is an internal space provided in a predetermined range from the base end part E2 of the sensor element 101. Air (oxygen) as reference gas for calculating the concentration of the sensing target gas component is introduced into the reference gas introduction space 30 from the outside. Accordingly, when the gas sensor 100 is used, the circumference of the reference electrode 20 is always filled with the air (oxygen). Thus, during the use of the gas sensor 100, the reference electrode 20 constantly has a constant potential.

The reference gas introduction space 30 is prevented from contacting with measurement gas by the surrounding solid electrolyte. Thus, the reference electrode 20 does not come into contact with the measurement gas even when the first sensing electrode 10A and the second sensing electrode 10B are exposed to the measurement gas.

In the configuration exemplarily illustrated in FIG. 1A, the reference gas introduction space 30 is provided as a space in which part of the fifth solid electrolyte layer 5 is communicated with the outside on the base end part E2 side of the sensor element 101.

The first protective layer 40 and the second protective layer 50 are each a porous layer made of alumina, which is provided so as to cover at least the first sensing electrode 10A and the second sensing electrode 10B on the front surface Sa of the sensor element 101. The first protective layer 40 and the second protective layer 50 are each provided as an electrode protective layer that prevents or reduces the degradation of the first sensing electrode 10A and the second sensing electrode 10B due to continuous exposure to a measurement gas during the use of the gas sensor 100.

In addition, the first protective layer 40 and the second protective layer 50 are provided so that the response times of the first mixed potential cell and the second mixed potential cell and the response time difference between both cells are sufficiently small. This will be described later in detail.

As illustrated in FIG. 1B, the gas sensor 100 is equipped with a first potentiometer 60A capable of measuring a potential difference between the first sensing electrode 10A and the reference electrode 20 and a second potentiometer 60B capable of measuring a potential difference between the second sensing electrode 10B and the reference electrode 20. Although FIG. 1B schematically illustrates wiring between both of the first sensing electrode 10A and the reference electrode 20, and the first potentiometer 60A and wiring between both of the second sensing electrode 10B and the reference electrode 20, and the second potentiometer 60B, in an actual sensor element 101, connection terminals (not illustrated) are provided correspondingly to the respective electrodes on the front surface Sa or the rear surface Sb on the base end part E2 side, and wiring patterns (not illustrated), which connect the respective electrodes and their corresponding connection terminals, are formed on the front surface Sa and inside the element. FIG. 2 exemplarily illustrates lead lines L1 and L2 as part of the wires. The first sensing electrode 10A and the reference electrode 20 are electrically connected with the first potentiometer 60A, and the second sensing electrode 10B and the reference electrode 20 are electrically connected with the second potentiometer 60B via the wiring patterns and the connection terminals.

Hereinbelow, a potential difference between the first sensing electrode 10A and the reference electrode 20, which is measured by the first potentiometer 60A, is also referred to as a first sensor output or EMF1, and a potential difference between the second sensing electrode 10B and the reference electrode 20, which is measured by the second potentiometer 60B, is also referred to as a second sensor output or EMF2.

The first sensor output and the second sensor output are both output to the controller 150 that controls the operation of the gas sensor 100. The first sensor output and the second sensor output provided to the controller 150 are further provided to an electronic control unit (ECU) 160 that entirely controls the internal combustion engine. The electronic control unit (ECU) 160 performs computations based on these outputs, thereby determining the concentration of the sensing target gas component near the sensor element 101.

The sensor element 101 further includes a heater part 70 configured to perform temperature adjustment involving heating and temperature maintenance of the sensor element 101 to increase the oxygen-ion conductivity of the solid electrolyte. The heater part 70 includes a heater 72, a heater insulating layer 74, and a pressure diffusion hole 75.

The heater 72 is an electric resistor provided inside the sensor element 101. The heater 72, which is connected with a heater electrode (not illustrated) being in contact with the rear surface Sb of the sensor element 101 (a lower surface of the first solid electrolyte layer 1 in FIGS. 1A and 1B), generates heat by being fed power via the heater electrode to heat the solid electrolytes forming the sensor element 101 and maintain their temperatures.

In the case illustrated in FIGS. 1A and 1B, the heater 72 is buried while being vertically sandwiched between the second solid electrolyte layer 2 and the third solid electrolyte layer 3 so as to range from the base end part E2 to the positions below the first sensing electrode 10A and the second sensing electrode 10B near the leading end part E1. With this configuration, the entire sensor element 101 can be adjusted to a temperature at which the solid electrolyte is activated.

The heater insulating layer 74 is made of insulator such as alumina and formed on upper and lower surfaces of the heater 72. The heater insulating layer 74 is formed to provide electric insulation between the second solid electrolyte layer 2 and the heater 72 and electric insulation between the third solid electrolyte layer 3 and the heater 72.

The pressure diffusion hole 75 is a site penetrating through the third solid electrolyte layer 3 and the fourth solid electrolyte layer 4, and communicated with the reference gas introduction space 30. The pressure diffusion hole 75 is formed to reduce increase in internal pressure along with increase in temperature inside the heater insulating layer 74.

<Process of Manufacturing Sensor Element>

Next, the process of manufacturing the sensor element 101 will be described using an example case where the sensor elements have the layer structures as illustrated in FIGS. 1A and 1B. Generally speaking, the sensor element 101 illustrated in FIGS. 1A and 1B are each manufactured by forming a laminated body formed of green sheets containing an oxygen-ion conductive solid electrolyte such as zirconia as a ceramic component and by cutting and firing the laminated body. Examples of the oxygen-ion conductive solid electrolyte include yttrium partially stabilized zirconia (YSZ).

Figure 3:
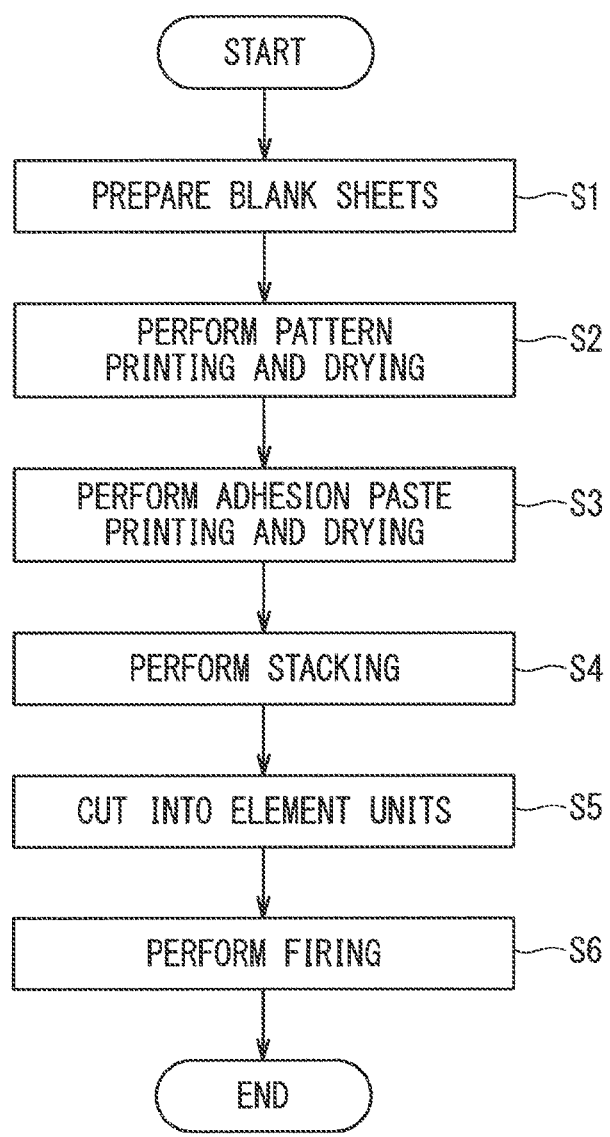
FIG. 3 is a diagram illustrating the flow of processing of producing the sensor element 101.

FIG. 3 is a diagram illustrating the flow of processing of producing the sensor element 101; When the sensor element 101 is manufactured, first, a blank sheet (not illustrated), which is a green sheet on which no pattern is formed, is prepared (step S1). Specifically, six blank sheets corresponding to the first to sixth solid electrolyte layers 1 to 6 are prepared when the sensor element 101 is to be manufactured. Each blank sheet is provided with a plurality of sheet holes used for positioning at printing and laminating. The sheet holes are formed in advance through, for example, punching processing by a punching apparatus. For a green sheet, the corresponding layer of which is the reference gas introduction space 30, a penetrating part corresponding to the reference gas introduction space 30 is also provided in advance through, for example, the same punching processing. All blank sheets corresponding to the respective layers of the sensor element 101 do not need to have identical thickness.

When the blank sheets corresponding to the respective layers are prepared, pattern printing and dry processing are performed to form various kinds of patterns on each blank sheet (step S2). Specifically, for example, electrode patterns of the first sensing electrode 10A, the second sensing electrode 10B, the reference electrode 20, and the like, patterns of the first protective layer 40, the second protective layer 50, and the like, patterns of the heater 72, the heater insulating layer 74, and the like, and patterns of internal wires (not illustrated) are formed.

The printing of each pattern is performed by applying, to a blank sheet, pattern formation paste prepared in accordance with a characteristic requested for each formation target by using a well-known screen printing technique. Well-known drying means may be employed for the dry processing after the printing.

Conductive paste prepared so as to excellently achieve the above-described Au abundance ratio is used to form the first sensing electrode 10A. It is preferable to use conductive paste prepared by using a Au ion-containing liquid as a Au starting material and mixing the Au ion-containing liquid with powdered Pt, powdered zirconia, and a binder. Alternatively, the conductive paste may be prepared by using coated powder, which is obtained by coating powdered Pt with Au, as a Pt—Au alloy starting raw material. Both can be realized by known techniques.

After the pattern printing ends, printing and dry processing are performed on bonding paste used to stack and bond the green sheets corresponding to the respective layers (step S3). The printing of the bonding paste may employ a well-known screen printing technology, and the dry processing after the printing may employ well-known drying means.

Subsequently, press bonding processing is performed in which the green sheets on the bonding agent is applied are stacked in a predetermined order and bonded by pressing under predetermined temperature and pressure conditions to form one laminated body (step S4). Specifically, the green sheets as laminating targets are stacked and held on a predetermined stacking jig (not illustrated) through positioning with reference to the sheet holes, and then heated and pressurized together with the stacking jig by a stacking machine such as a well-known hydraulic pressure press machine. Pressure, temperature, and time with which the heating and the pressurization are performed depend on the laminator in use, but appropriate conditions may be determined to achieve favorable lamination.

After the laminated body is obtained as described above, the laminated body is subsequently divided into individual units (referred to as element bodies) of the sensor element 101 through cutting at a plurality of places (step S5). The cut out element bodies are fired under predetermined conditions, thereby producing the sensor elements 101 as described above (step S6). Specifically, the sensor element 101 is generated through integration firing of solid electrolyte layers and electrodes. The temperature of the firing is preferably 1200° C. to 1500° C. inclusive (for example, 1400° C.). When the integration firing is performed in this manner, each electrode in the sensor element 101 has sufficient adhesion strength.

The sensor element 101 obtained through this process is housed in a predetermined housing and incorporated in the main body (not illustrated) of the gas sensor 100.

<Identification of Sensing Target Gas Component Concentration>

The following describes a case where the concentration of the sensing target gas component in the measurement gas is obtained by using the gas sensor 100 having the above-described configuration. It is assumed that oxygen is contained in the measurement gas in addition to the sensing target gas component. In addition, from the viewpoint of accuracy improvement, the response times (and difference) of the first sensing electrode 10A and the second sensing electrode 10B need to be taken into consideration, but are not discussed here for simplicity of description.

When the concentration of the sensing target gas component is determined, the gas sensor 100 is disposed so that only the predetermined range of the sensor element 101 extending from the leading end part E1 and including at least the first sensing electrode 10A and the second sensing electrode 10B is positioned in a space in which the measurement gas exists as described above, whereas the base end part E2 side is isolated from the space. Then, air (oxygen) is supplied to the reference gas introduction space 30. The sensor element 101 is heated to an appropriate temperature (for example, 650° C.) of 450° C. to 700° C. by the heater 72. The temperature of heating of the sensor element 101 by the heater 72 when the gas sensor 100 is used also referred to as a drive temperature.

In this state, a potential difference is generated between both of the first sensing electrode 10A and the second sensing electrode 10B exposed to the measurement gas and the reference electrode 20 disposed in the air. However, as described above, the potential of the reference electrode 20 disposed in the air (constant oxygen concentration) atmosphere is kept constant, but the potential of the first sensing electrode 10A has concentration dependency on the sensing target gas component in the measurement gas. The potential of the second sensing electrode 10B has no concentration dependency on the sensing target gas component but has concentration dependency on oxygen. Thus, a certain functional relation (referred to as a sensitivity characteristic) is held between the concentration of the sensing target gas component and the first sensor output (EMF1). No dependency exists between the concentration of the sensing target gas component and the second sensor output (EMF2), but the second sensor output has a value in accordance with the oxygen concentration of the measurement gas.

In the following description, for example, the sensitivity characteristic for the first sensor output may be referred to as a first sensitivity characteristic.

In the actual determination of the concentration of the sensing target gas component, in advance, the first and second sensitivity characteristics are experimentally identified by measuring the first sensor output and the second sensor output for each of a plurality of different mixed gases as the measurement gas, each of which has a known concentration of the sensing target gas component. The resultant first and second sensitivity characteristics are then stored in the ECU 160.

Figure 4A:
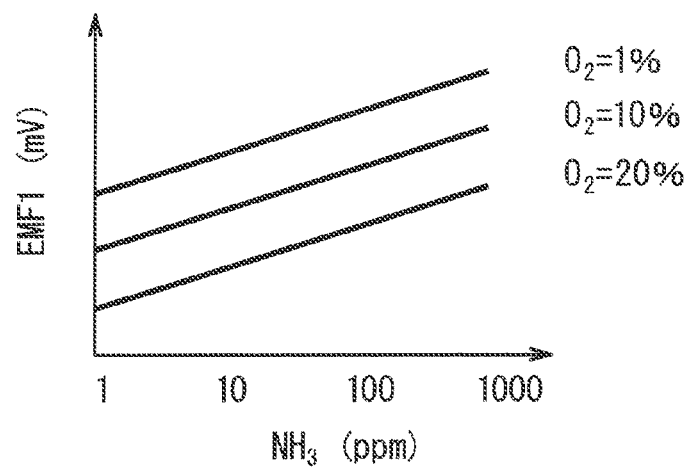
FIGS. 4A and 4B are diagrams schematically illustrating a sensitivity characteristic of the gas sensor 100 in the case that a sensing target gas component is ammonia ($NH_3$) gas.
Figure 4B:
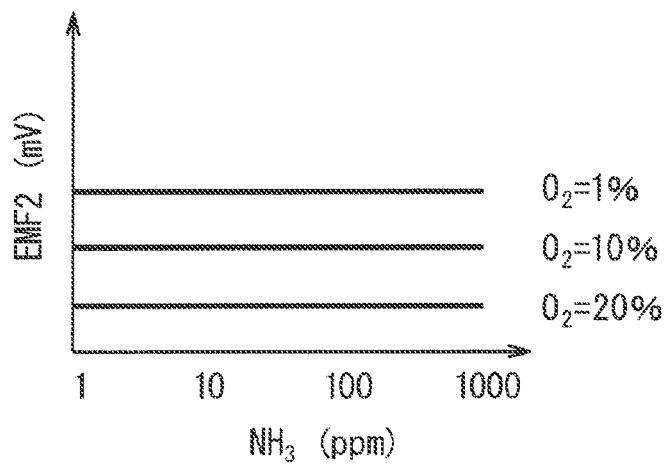

FIGS. 4A and 4B are diagrams schematically illustrating a sensitivity characteristic of the gas sensor 100 in the case that a sensing target gas component is ammonia ($NH_3$) gas. FIG. 4A exemplarily illustrates the first sensitivity characteristic, and FIG. 4B exemplarily illustrates the second sensitivity characteristic. The ammonia ($NH_3$) gas concentration on the horizontal axis is in the logarithmic scale.

As illustrated in FIG. 4A, the first sensitivity characteristic depends on the concentration of the sensing target gas component (ammonia ($NH_3$) gas) and the concentration of oxygen, but is linear relative to the logarithmic value of the concentration of the sensing target gas component under the condition of constant oxygen ($O_2$) concentration. As illustrated in FIG. 4B, the second sensitivity characteristic depends only on the oxygen ($O_2$) concentration, but does not depend on the concentration of the sensing target gas component. Although FIGS. 4A and 4B only exemplarily illustrate the sensitivity characteristics for the oxygen ($O_2$) concentrations of 1%, 10%, and 20%, the sensitivity characteristics may be identified for a larger number of oxygen concentrations for each gas sensor 100.

When the gas sensor 100 is actually used, the first sensor output (EMF1) and the second sensor output (EMF2) that momentarily change in accordance with the concentration of the sensing target gas component are constantly acquired from the first mixed potential cell and the second mixed potential cell by the controller 150 and provided to the ECU

160. At the ECU 160, first, the concentration of oxygen of the measurement gas is identified based on the acquired value of the second sensor output. Then, the concentration of the sensing target gas component in the measurement gas is identified from the value of the first sensor output, using the first sensitivity characteristic corresponding to the above-identified concentration of oxygen. When the second sensitivity characteristic that provides the concentration of oxygen corresponding to the value of the second sensor output is not stored in the ECU 160, the concentration of oxygen of the measurement gas is identified by interpolation using the existing second sensitivity characteristics. When the first sensitivity characteristic corresponding to the identified oxygen concentration is not stored in the ECU 160, too, the concentration of oxygen of the measurement gas is identified by interpolation using the existing first sensitivity characteristics.

Such processing is performed each time the first sensor output and the second sensor output are acquired by the controller 150 and further the ECU 160. Thus, even when the measurement gas contains oxygen in addition to the sensing target gas component, the gas sensor 100 can identify the concentration of the sensing target gas component based on the first sensitivity characteristic in accordance with the concentration of oxygen. In this case, the controller 150 and the ECU 160 function as concentration identification means for identifying the concentration of the sensing target gas component.

As described above, in the present preferred embodiment, the concentration of the sensing target gas component is corrected based on the concentration of oxygen in a manner that different sensitivity characteristics are applied in accordance with the concentration of oxygen. By performing the correction, the gas sensor 100 according to the present preferred embodiment can identify the concentration of the sensing target gas component without the $O_2$ interference.

<Adjustment of Response Time Difference>

The identification of the concentration of the sensing target gas component in the above-described aspect is effective in that the $O_2$ interference is excluded. However, this aspect is based on a premise that electromotive forces (sensor outputs) occurring to the first sensing electrode 10A and the second sensing electrode 10B at identical timings are used to identify the concentration of the sensing target gas component. To be precise, it is known that, among the first sensor output and the second sensor output for the measurement gas having reached both electrodes at identical timings, the latter is output from the controller 150 earlier. In other words, the first sensor output and the second sensor output acquired by the controller 150 at identical timings are values for the measurement gas having reached the first sensing electrode 10A and the second sensing electrode 10B at different timings. This is because the electrode reaction rate of the first sensing electrode 10A containing Pt—Au alloy as a metal component is slower than the electrode reaction rate of the second sensing electrode 10B containing Pt only.

Thus, the second sensor output obtained from the second mixed potential cell including the second sensing electrode 10B responds more rapidly to change in the components of the measurement gas and thereby changes than the first sensor output obtained from the first mixed potential cell including the first sensing electrode 10A. In other words, the second sensing electrode 10B (or the second mixed potential cell including the second sensing electrode 10B) has a shorter response time or a more (relatively) excellent responsivity than the first sensing electrode 10A (or the first mixed potential cell including the first sensing electrode 10A).

If the concentration of the sensing target gas component is identified in the above-described aspect based on the first sensor output and the second sensor output obtained by the controller 150 at identical timings while there is such a response time difference or responsivity difference, the identification of the oxygen concentration based on the second sensor output is performed based on the measurement gas different from the measurement gas when the first sensor output is obtained, and as a result, the reliability of a finally obtained concentration of the sensing target gas component may be potentially degraded.

The following describes definition of the response time of a sensing electrode in the present preferred embodiment. FIG. 5 is a diagram illustrating a response measurement profile for the description.

In the present preferred embodiment, the response time of each sensing electrode is determined based on a result of measurement of change in the sensor output (electromotive force) of the sensing electrode when the concentration of oxygen in model gas is instantaneously changed from 20% to 1% while the gas sensor 100 is disposed in the model gas. The model gas contains $H_2O$ of 5% and $N_2$ as the balance in addition to oxygen. The model gas has a temperature of 120° C. and a flow rate of 200 L/min, and the sensor element 101 has a drive temperature of 650° C. Hereinafter, a condition for obtaining these response times is referred to as a response time measurement condition.

Specifically, as illustrated in FIG. 5, when the concentration of oxygen in the model gas is instantaneously changed from 20% to 1%, the electromotive force value changes accordingly. A temporal change profile of the electromotive force value as illustrated in FIG. 5, which is obtained in such a case is referred to as a response measurement profile. In the response measurement profile, the timing when the concentration of oxygen in the model gas is changed is set to t=0, $V_0$ represents the electromotive force value (the first sensor output or the second sensor output) before the concentration of oxygen in the model gas is changed to 1%, $V_{100}$ represents the electromotive force value when the electromotive force becomes stable after the concentration of oxygen is changed to 1% at t=0, $V_{10}$ represents the electromotive force value when change is made by 10% of the difference value between the values halfway through change of the electromotive force value from $V_0$ to $V_{100}$, and $V_{90}$ represents the electromotive force value when change is made by 90% similarly. In addition, $V_{10}$ represents the electromotive force value at t=$t_{10}$, $V_{90}$ represents the electromotive force value at t=$t_{90}$ and the value of tr=$t_{90}$−$t_{10}$ as the difference value therebetween is defined as the response time of the sensing electrode. The responsivity is more excellent as the response time is shorter.

In the present preferred embodiment, in view of the responsivity difference intrinsically possessed by the first sensing electrode 10A and the second sensing electrode 10B attributable to the composition difference therebetween as described above, the response times of the first mixed potential cell and the second mixed potential cell and the response time difference therebetween are set to be sufficiently small values in light of measurement accuracy, by contriving the configurations of the first protective layer 40 and the second protective layer 50.

Specifically, the first protective layer 40 covering the first sensing electrode 10A and the second protective layer 50 covering the second sensing electrode 10B are provided so that the response times of both the first sensing electrode 10A and the second sensing electrode 10B are equal to or shorter than 10 seconds and (the absolute value of) the response time difference therebetween is equal to or shorter than two seconds. In such a case, it is possible to identify the concentration of the sensing target gas component without the $O_2$ interference at preferable accuracy.

This is achieved, for example, when the first protective layer 40 has a porosity equal or more than 30% and equal or less than 40% and a thickness equal or more than 15 μm and equal or less than 200 μm and the second protective layer 50 has a porosity equal or more than 10% and equal or less than 40% and a thickness equal or more than 15 μm and equal or less than 200 μm. The requirement on the first protective layer 40 is preferably determined with additionally taken into consideration any factor other than adjustment of the response time difference such as prevention of poisoning of the first sensing electrode 10A. The upper limit of the porosity of each of the first protective layer 40 and the second protective layer 50 is determined also in view of the fact that these layers are formed by a printing method as described above.

The first protective layer 40 and the second protective layer 50 are preferably provided so that the response time difference between the first sensing electrode 10A and the second sensing electrode 10B is one second or shorter. In such a case, the gas sensor 100 is considered to have an extremely excellent responsivity. This is achieved, for example, when the first protective layer 40 has a porosity equal or more than 30% and equal or less than 40% and a thickness equal or more than 15 μm and equal or less than 200 μm and the second protective layer 50 has a porosity equal or more than 10% and equal or less than 20% and a thickness equal or more than 15 μm and equal or less than 30 μm.

The response time of the first sensing electrode 10A may be shorter than that of the second sensing electrode 10B depending on the configurations of the first protective layer 40 and the second protective layer 50, but such a case is allowed as long as the response time difference is two seconds or shorter.

<When a Plurality of Protective Layers are Stacked>

The configuration in which the gas sensor 100 includes protective layers covering the first sensing electrode 10A and the second sensing electrode 10B is not limited to those illustrated in FIGS. 1A and 1B. FIGS. 6A and 6B is a diagram illustrating a configuration in which a leading end protective layer 80 is provided on a predetermined range of the sensor element 101 on the leading end part E1 side to cover not only the first sensing electrode 10A and the second sensing electrode 10B but also the entire outer periphery of sensor element 101. FIG. 6A is a vertical cross-sectional view along the element longitudinal direction of the sensor element 101, and FIG. 6B is a cross-sectional view orthogonal to the element longitudinal direction taken along line B-B' in FIG. 6A.

The leading end protective layer 80 is a porous layer made of alumina and formed to have a porosity of 30% or higher and a thickness equal or more than 50 μm and equal or less than 300 μm approximately. The leading end protective layer 80 is formed in the sensor element 101 (fired body) obtained through the above-described green sheet process by a well-known method such as plasma spraying, spray coating, gel cast, or dipping. The thickness of the leading end protective layer 80 can be easily controlled by any of the methods.

Such a configuration including the leading end protective layer 80 can be employed as long as the response times of the first sensing electrode 10A and the second sensing electrode 10B are equal to or shorter than 10 seconds, (the absolute value of) the response time difference therebetween is 2 seconds or shorter, and the thickness sum of the first sensing electrode 10A and the leading end protective layer 80 and the thickness sum of the second sensing electrode 10B and the leading end protective layer 80 are both 200 μm or smaller.

Furthermore, the configuration in which the first protective layer 40 and the second protective layer 50 each have a multi-layer structure can be employed.

Accordingly, in the gas sensor 100 according to the present preferred embodiment, when one or a plurality of protective layers are provided on each of the first sensing electrode 10A and the second sensing electrode 10B provided to the sensor element 101 and the response time difference between both electrodes is 2 seconds or shorter, a protective layer group (hereinafter referred to as a first protective layer group, including a case of one layer only) provided on the first sensing electrode 10A and a protective layer group (hereinafter referred to as a second protective layer group, including a case of one layer only) provided on the second sensing electrode 10B each need only to satisfy requirements as follows, in consideration of the above-described requirements related to the first protective layer 40 and the second protective layer 50.

First protective layer group: a layer having a minimum porosity has a porosity equal or more than 30% and equal or less than 40% and a thickness equal or more than 15 μm and equal or less than 200 μm, and the first protective layer group has a total thickness of 200 μm or smaller; and Second protective layer group: a layer having a minimum porosity has a porosity equal or more than 10% and equal or less than 40% and a thickness equal or more than 15 μm and equal or less than 200 μm, and the second protective layer group has a total thickness of 200 μm or smaller.

In such a case, in the gas sensor 100, the concentration of the sensing target gas component can be identified without the $O_2$ interference at preferable accuracy while the responsivity is achieved. In other words, the responsivity same as a case in which only the first protective layer 40 and the second protective layer 50 are provided can be obtained as long as a protective layer that most limits introduction (reach at the first sensing electrode 10A and the second sensing electrode 10B) of the measurement gas has a porosity and a thickness equivalent to those of the first protective layer 40 and the second protective layer 50 described above, and as long as the total thickness of the first protective layer group and the total thickness of the second protective layer group do not exceed a maximum value assumed as the thickness of the first protective layer 40 and the second protective layer 50.

When the leading end protective layer 80 is provided, the leading end protective layer 80 serves as the outermost layer of the first protective layer group and the second protective layer group.

Note that the first protective layer group and the second protective layer group do not necessarily need to be formed of a plurality of layers at the same time, but one of the first protective layer group and the second protective layer group may be formed of one layer and the other may be formed of a plurality of layers.

The second protective layer group is preferably provided to satisfy requirements as follows.

Second protective layer group: a layer having a minimum porosity has a porosity equal or more than 10% and equal or less than 20% and a thickness equal or more than 15 μm and equal or less than 30 μm.

In such a case, in the gas sensor 100, the concentration of the sensing target gas component can be identified without the $O_2$ interference at more excellent accuracy while the responsivity is achieved.

EXAMPLE

A total of 53 kinds of gas sensors 100 (No. 1 to No. 53) having different combinations of the porosity and thickness of the first protective layer 40 and the porosity and thickness of the second protective layer 50 were produced.

Specifically, a porosity of the first protective layer 40 and the second protective layer 50 each was varied in four levels of 40%, 30%, 20%, or 10%. A thickness of the first protective layer 40 and the second protective layer 50 each was varied in three levels of 15 μm, 30 μm, or 200 μm. However, for the gas sensor 100 in which the thickness of the first protective layer 40 was 200 μm, the thickness of the second protective layer 50 was 200 μm and the first protective layer 40 and the second protective layer 50 had porosities equal to each other. In the present preferred embodiment, a binary image of a cross-sectional SEM image (secondary electron image) captured under conditions of the acceleration voltage of 5 kV and the magnification of 5000 was used for porosity identification.

The first sensing electrode 10A was formed to have a thickness of 15 μm, a porosity of 35%, and an Au abundance ratio of 1.01. The second sensing electrode 10B was formed to have a thickness of 15 μm and a porosity of 35%. The reference electrode 20 was formed to have a thickness of 15 μm and a porosity of 35%.

As for the sizes of the components illustrated in FIG. 2, L0 was 63 mm, w0 was 4 mm, t1 and t2 were 2 mm, w1 and w2 were 1 mm, d1 was 4 mm, and d2 was 0.5 mm.

Then, the response times of the first sensing electrode 10A and the second sensing electrode 10B were measured for the gas sensor 100 thus obtained in accordance with the above-described response time measurement condition, and the response time difference was calculated. The quality of the responsivity of each gas sensor 100 was determined based on the result.

Figure 7:
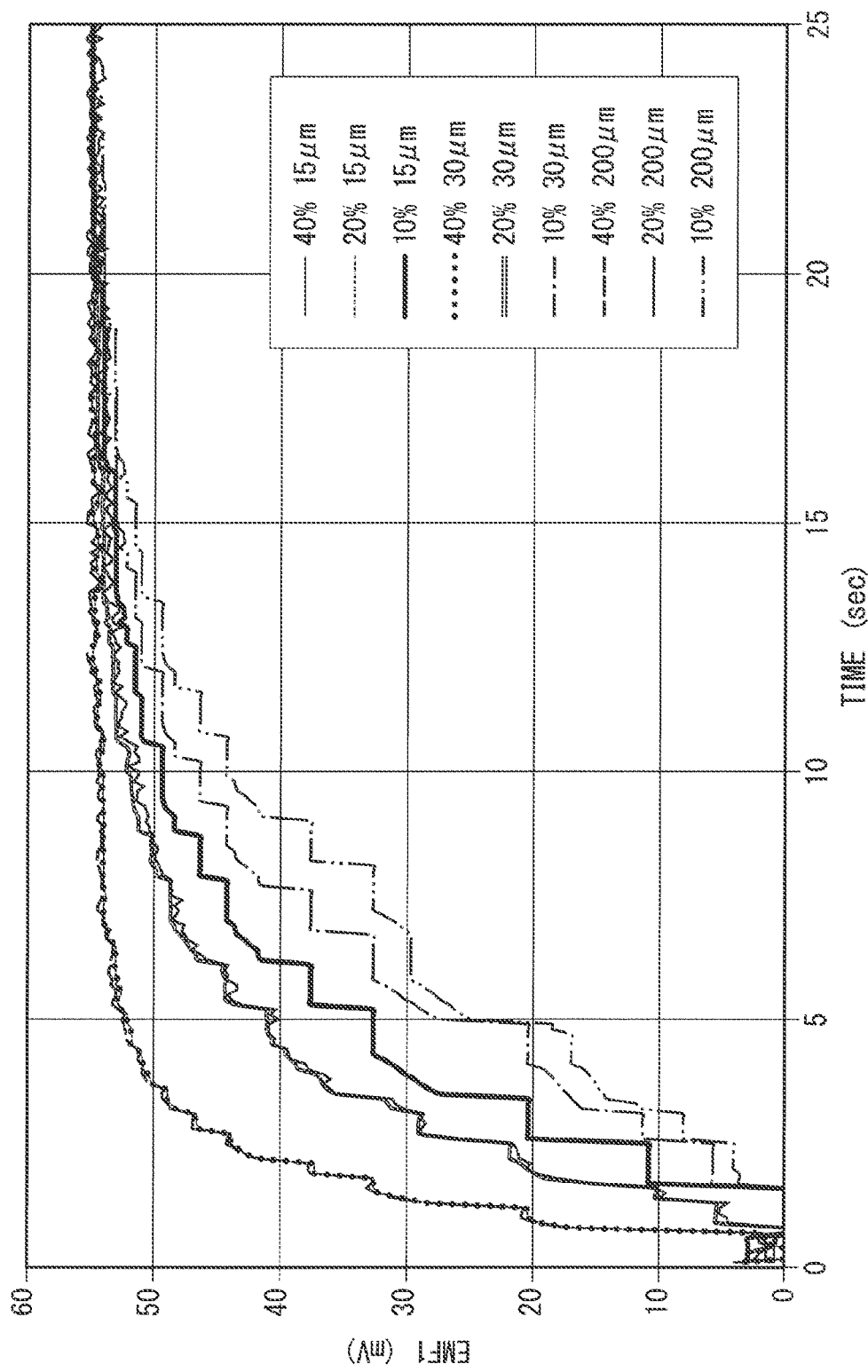
FIG. 7 is a diagram exemplarily illustrating the response measurement profile for nine kinds of the gas sensors 100 among which the porosity and thickness of a first protective layer 40 are different.

FIG. 7 is a diagram exemplarily illustrating the response measurement profile for each of the nine kinds of gas sensors 100 (corresponding to No. 1, No. 7, No. 13, No. 19, No. 25, No. 31, and No. 37 to No. 39) among which the porosity and thickness of the first protective layer 40 are different. FIG. 8 is a diagram exemplarily illustrating the response measurement profile for each of the nine kinds of gas sensors 100 (corresponding to No. 1 to No. 6 and No. 37 to No. 39) between which the porosity and thickness of the second protective layer 50 are different. Tables 1 and 2 list, for the 53 kinds of gas sensors 100, the porosity and thickness of the first protective layer 40, the porosity and thickness of the second protective layer 50, the response times of the first sensing electrode 10A and the second sensing electrode 10B calculated from the response measurement profile, the response time difference as the difference value between the response times, and a result of the quality determination of the responsivity of the gas sensor 100 based on the value (Table 1: No. 1 to No. 30, and Table 2: No. 31 to No. 53).

TABLE 1

| No. | First Protective Layer Porosity (%) | First Protective Layer Thickness (μm) | First Sensing Electrode Response Time (sec) | Second Protective Layer Porosity (%) | Second Protective Layer Thickness (μm) | Second Sensing Electrode Response Time (sec) | Response Time Difference (sec) | Quality Determination |
|---|---|---|---|---|---|---|---|---|
| 1 | 40 | 15 | 2.9 | 40 | 15 | 1.1 | 1.8 | Δ |
| 2 | 40 | 15 | 2.9 | 20 | 15 | 2.9 | 0 | ○ |
| 3 | 40 | 15 | 2.9 | 10 | 15 | 2.9 | 0 | ○ |
| 4 | 40 | 15 | 2.9 | 40 | 30 | 1.4 | 1.5 | Δ |
| 5 | 40 | 15 | 2.9 | 20 | 30 | 3.2 | −0.3 | ○ |
| 6 | 40 | 15 | 2.9 | 10 | 30 | 3.5 | −0.6 | ○ |
| 7 | 20 | 15 | 6.5 | 40 | 15 | 1.1 | 5.4 | X |
| 8 | 20 | 15 | 6.5 | 20 | 15 | 2.9 | 3.6 | X |
| 9 | 20 | 15 | 6.5 | 10 | 15 | 2.9 | 3.6 | X |
| 10 | 20 | 15 | 6.5 | 40 | 30 | 1.4 | 5.1 | X |
| 11 | 20 | 15 | 6.5 | 20 | 30 | 3.2 | 3.3 | X |
| 12 | 20 | 15 | 6.5 | 10 | 30 | 3.5 | 3 | X |
| 13 | 10 | 15 | 8.9 | 40 | 15 | 1.1 | 7.8 | X |
| 14 | 10 | 15 | 8.9 | 20 | 15 | 2.9 | 6 | X |
| 15 | 10 | 15 | 8.9 | 10 | 15 | 2.9 | 6 | X |
| 16 | 10 | 15 | 8.9 | 40 | 30 | 1.4 | 7.5 | X |
| 17 | 10 | 15 | 8.9 | 20 | 30 | 3.2 | 5.7 | X |
| 18 | 10 | 15 | 8.9 | 10 | 30 | 3.5 | 5.4 | X |
| 19 | 40 | 30 | 2.9 | 40 | 15 | 1.1 | 1.8 | Δ |
| 20 | 40 | 30 | 2.9 | 20 | 15 | 2.9 | 0 | ○ |
| 21 | 40 | 30 | 2.9 | 10 | 15 | 2.9 | 0 | ○ |
| 22 | 40 | 30 | 2.9 | 40 | 30 | 1.4 | 1.5 | Δ |
| 23 | 40 | 30 | 2.9 | 20 | 30 | 3.2 | −0.3 | ○ |
| 24 | 40 | 30 | 2.9 | 10 | 30 | 3.5 | −0.6 | ○ |
| 25 | 20 | 30 | 6.5 | 40 | 15 | 1.1 | 5.4 | X |
| 26 | 20 | 30 | 6.5 | 20 | 15 | 2.9 | 3.6 | X |
| 27 | 20 | 30 | 6.5 | 10 | 15 | 2.9 | 3.6 | X |
| 28 | 20 | 30 | 6.5 | 40 | 30 | 1.4 | 5.1 | X |
| 29 | 20 | 30 | 6.5 | 20 | 30 | 3.2 | 3.3 | X |
| 30 | 20 | 30 | 6.5 | 10 | 30 | 3.5 | 3 | X |

TABLE 2

| No. | First Protective Layer Porosity (%) | First Protective Layer Thickness (μm) | First Sensing Electrode Response Time (sec) | Second Protective Layer Porosity (%) | Second Protective Layer Thickness (μm) | Second Sensing Electrode Response Time (sec) | Response Time Difference (sec) | Quality Determination |
|---|---|---|---|---|---|---|---|---|
| 31 | 10 | 30  | 10.4 | 40 | 15  | 1.1 | 9.3  | X |
| 32 | 10 | 30  | 10.4 | 20 | 15  | 2.9 | 7.5  | X |
| 33 | 10 | 30  | 10.4 | 10 | 15  | 2.9 | 7.5  | X |
| 34 | 10 | 30  | 10.4 | 40 | 30  | 1.4 | 9    | X |
| 35 | 10 | 30  | 10.4 | 20 | 30  | 3.2 | 7.2  | X |
| 36 | 10 | 30  | 10.4 | 10 | 30  | 3.5 | 6.9  | X |
| 37 | 40 | 200 | 2.9  | 40 | 200 | 1.4 | 1.5  | Δ |
| 38 | 20 | 200 | 6.7  | 20 | 200 | 3.3 | 3.4  | X |
| 39 | 10 | 200 | 10.9 | 10 | 200 | 3.7 | 7.2  | X |
| 40 | 30 | 15  | 3.1  | 40 | 15  | 1.1 | 2    | Δ |
| 41 | 30 | 15  | 3.1  | 20 | 15  | 2.9 | 0.2  | ○ |
| 42 | 30 | 15  | 3.1  | 10 | 15  | 2.9 | 0.2  | ○ |
| 43 | 30 | 15  | 3.1  | 40 | 30  | 1.4 | 1.7  | Δ |
| 44 | 30 | 15  | 3.1  | 20 | 30  | 3.2 | -0.1 | ○ |
| 45 | 30 | 30  | 3.1  | 40 | 15  | 1.1 | 2    | Δ |
| 46 | 30 | 30  | 3.1  | 20 | 15  | 2.9 | 0.2  | ○ |
| 47 | 30 | 30  | 3.1  | 10 | 15  | 2.9 | 0.2  | ○ |
| 48 | 30 | 30  | 3.1  | 40 | 30  | 1.4 | 1.7  | Δ |
| 49 | 30 | 30  | 3.1  | 20 | 30  | 3.2 | -0.1 | ○ |
| 50 | 30 | 30  | 3.1  | 10 | 30  | 3.5 | -0.4 | ○ |
| 51 | 30 | 15  | 3.1  | 30 | 15  | 1.5 | 1.6  | Δ |
| 52 | 30 | 30  | 3.1  | 30 | 30  | 1.6 | 1.5  | Δ |
| 53 | 30 | 200 | 3.1  | 30 | 200 | 1.7 | 1.4  | Δ |

The quality determination of the responsivity of the gas sensor 100 was performed based on the following criteria.

"Extremely excellent responsivity" (circles in Tables 1 and 2):

The response times of the first sensing electrode 10A and the second sensing electrode 10B are both equal to or shorter than 10 seconds, and the response time difference is equal to or shorter than 1 second;

"Excellent responsivity" (triangles in Tables 1 and 2):

The response times of the first sensing electrode 10A and the second sensing electrode 10B are both equal to or shorter than 10 seconds, and the response time difference is longer than 1 second and equal to or shorter than 2 seconds;

"Less excellent responsivity" (crosses in Tables 1 and 2):
Cases other than above-described two cases.

As indicated in Tables 1 and 2, it has been confirmed that the excellent responsivity of the response time difference of 2 seconds or shorter was achieved in the gas sensor 100 in which the first protective layer 40 had a porosity of 40% in the range of 30% to 40% inclusive and a thickness in a range of 15 μm to 200 μm inclusive, and the second protective layer 50 had a porosity in a range of 10% to 40% inclusive and a thickness in a range of 15 μm to 200 μm inclusive.

In particular, it has been confirmed that the extremely excellent responsivity of the response time difference of 1 second or shorter was achieved when the second protective layer 50 had a porosity in a range of 10% to 20% inclusive and a thickness in a range of 15 μm to 30 μm inclusive.

While the invention has been shown and described in detail, the foregoing description is in all aspects illustrative and not restrictive. It is therefore understood that numerous modifications and variations can be devised without departing from the scope of the invention.

What is claimed is:

1. A mixed-potential gas sensor configured to sense a sensing target gas component contained in measurement gas and identify a concentration of the sensing target gas component, the gas sensor comprising:

a sensor element made of an oxygen-ion conductive solid electrolyte;

a first sensing electrode as a cermet electrode provided on a surface of said sensor element and containing a Pt—Au alloy;

a second sensing electrode as a cermet electrode provided on the surface of said sensor element and containing Pt;

a reference electrode provided inside said sensor element to be made contact with air;

a first protective layer group including one or a plurality of porous protective layers each covering said first sensing electrode;

a second protective layer group including one or a plurality of porous protective layers each covering said second sensing electrode; and a controller and an electronic control unit (ECU) configured to identify the concentration of said sensing target gas component in said measurement gas, said controller being configured to acquire, while said gas sensor is disposed in said measurement gas, a first sensor output as a potential difference occurring between said first sensing electrode and said reference electrode in accordance with the concentration of said sensing target gas component and a concentration of oxygen, and a second sensor output as a potential difference occurring between said second sensing electrode and said reference electrode in accordance with the concentration of oxygen, and provide the first and second sensor outputs to the ECU, and the ECU being configured to identify the concentration of said sensing target gas component in said measurement gas based on said first and second sensor outputs, wherein said first and second sensing electrodes each have a response time of 10 seconds or shorter, and a difference between the response time of said first sensing electrode and the response time of said second sensing electrode is 2 seconds or shorter.

2. The gas sensor according to claim 1, wherein
a protective layer having a minimum porosity among the protective layers included in said first protective layer group has a porosity equal or more than 30% and equal or less than 40% and a thickness equal or more than 15 µm and equal or less than 200 µm,
said first protective layer group has a total thickness of 200 µm or smaller,
a protective layer having a minimum porosity among the protective layers included in said second protective layer group has a porosity equal or more than 10% and equal or less than 40% and a thickness equal or more than 15 µm and equal or less than 200 µm, and
said second protective layer group has a total thickness of 200 µm or smaller.

3. The gas sensor according to claim 2, wherein a protective layer having a minimum porosity among the protective layers included in said second protective layer group has a porosity equal or more than 10% and equal or less than 20% and a thickness equal or more than 15 µm and equal or less than 30 µm.

4. The gas sensor according to claim 3, wherein
said sensor element includes a leading end protective layer provided on an outer periphery of one end part side of said sensor element and extending from the one end part side of said sensor element to cover at least said first and second sensing electrodes, and
said leading end protective layer serves as an outermost layer in each of said first protective layer group and said second protective layer group.

5. The gas sensor according to claim 4, wherein
the ECU stores a first predetermined sensitivity characteristic as a functional relation between said first sensor output and each of the concentration of said sensing target gas component and the concentration of oxygen, and a second predetermined sensitivity characteristic as a functional relation between said second sensor output and the concentration of oxygen, and
the ECU further being configured to
identify the concentration of oxygen in said measurement gas from an acquired value of said second sensor output based on said second sensitivity characteristic, and
identify the concentration of said sensing target gas component in said measurement gas from the identified oxygen concentration and the acquired value of said first sensor output based on said first sensitivity characteristic.

6. The gas sensor according to claim 3, wherein
the ECU stores a first predetermined sensitivity characteristic as a functional relation between said first sensor output and each of the concentration of said sensing target gas component and the concentration of oxygen, and a second predetermined sensitivity characteristic as a functional relation between said second sensor output and the concentration of oxygen, and
the ECU further being configured to
identify the concentration of oxygen in said measurement gas from an acquired value of said second sensor output based on said second sensitivity characteristic, and
identify the concentration of said sensing target gas component in said measurement gas from the identified oxygen concentration and the acquired value of said first sensor output based on said first sensitivity characteristic.

7. The gas sensor according to claim 2, wherein
said sensor element includes a leading end protective layer provided on an outer periphery of one end part side of said sensor element and extending from one end part side of said sensor element to cover at least said first and second sensing electrodes, and
said leading end protective layer serves as an outermost layer in each of said first protective layer group and said second protective layer group.

8. The gas sensor according to claim 7, wherein
the ECU stores a first predetermined sensitivity characteristic as a functional relation between said first sensor output and each of the concentration of said sensing target gas component and the concentration of oxygen, and a second predetermined sensitivity characteristic as a functional relation between said second sensor output and the concentration of oxygen, and
the ECU further being configured to
identify the concentration of oxygen in said measurement gas from an acquired value of said second sensor output based on said second sensitivity characteristic, and
identify the concentration of said sensing target gas component in said measurement gas from the identified oxygen concentration and the acquired value of said first sensor output based on said first sensitivity characteristic.

9. The gas sensor according to claim 2, wherein
the ECU stores a first predetermined sensitivity characteristic as a functional relation between said first sensor output and each of the concentration of said sensing target gas component and the concentration of oxygen, and a second predetermined sensitivity characteristic as a functional relation between said second sensor output and the concentration of oxygen, and
the ECU further being configured to
identify the concentration of oxygen in said measurement gas from an acquired value of said second sensor output based on said second sensitivity characteristic, and
identify the concentration of said sensing target gas component in said measurement gas from the identified oxygen concentration and the acquired value of said first sensor output based on said first sensitivity characteristic.

10. The gas sensor according to claim 1, wherein
the ECU stores a first predetermined sensitivity characteristic as a functional relation between said first sensor output and each of the concentration of said sensing target gas component and the concentration of oxygen, and a second predetermined sensitivity characteristic as a functional relation between said second sensor output and the concentration of oxygen, and
the ECU further being configured to
identify the concentration of oxygen in said measurement gas from an acquired value of said second sensor output based on said second sensitivity characteristic, and
identify the concentration of said sensing target gas component in said measurement gas from the identified oxygen concentration and the acquired value of said first sensor output based on said first sensitivity characteristic.

* * * * *